Jan. 20, 1959   L. A. LEIFER   2,869,390
AUTOMATIC DRIVE SPEED CONTROL
Filed Jan. 4, 1954   6 Sheets-Sheet 1

FIG.1.

INVENTOR.
Lorenz A. Leifer
BY
ATTORNEYS.

Jan. 20, 1959   L. A. LEIFER   2,869,390
AUTOMATIC DRIVE SPEED CONTROL
Filed Jan. 4, 1954   6 Sheets-Sheet 2

INVENTOR.
Lorenz A. Leifer
BY
Andrus & Sceales
ATTORNEYS.

INVENTOR.
Lorenz A. Leifer
BY
Andrus & Sceales
ATTORNEYS.

Jan. 20, 1959 L. A. LEIFER 2,869,390
AUTOMATIC DRIVE SPEED CONTROL
Filed Jan. 4, 1954 6 Sheets-Sheet 4

INVENTOR.
Lorenz A. Leifer
BY
ATTORNEYS.

Jan. 20, 1959   L. A. LEIFER   2,869,390
AUTOMATIC DRIVE SPEED CONTROL
Filed Jan. 4, 1954   6 Sheets-Sheet 5

INVENTOR.
Lorenz A. Leifer
BY
ATTORNEYS.

United States Patent Office 2,869,390
Patented Jan. 20, 1959

2,869,390

AUTOMATIC DRIVE SPEED CONTROL

Lorenz Albert Leifer, Madison, Wis., assignor to Gisholt Machine Company, Madison, Wis., a corporation of Wisconsin Application January 4, 1954, Serial No. 401,974

4 Claims. (Cl. 74—472)

This invention relates to an automatic drive speed control where accurate speed shifts are desired with infinite adjustment within operating speed ranges. The invention has been applied to spindles such as those employed in lathes and the like.

Heretofore there have been two general automatic speed control systems for spindle drives: (1) employing gear shifts in the headstock of the lathe, and (2) employing complicated electronic motor speed controls.

The first system generally requires a large number of variable speed gear trains with fixed ratios, and cannot provide for infinite adjustment settings within the overall speed range. Usually, expensive selector mechanism has to be employed to obtain automatic shifting of the gears.

The second system generally requires complicated electronic circuits for controlling the current to the drive motor, and can only vary the speed of the motor over a small range of speeds due to the fact that the motor horsepower is varied correspondingly. The constant torque output does not give sufficient horsepower at lower speeds for proper machining operations, and the range of speeds must be limited to a suitable horsepower output for the motor.

The present invention when applied to a lathe provides a spindle speed control which does not rely upon motor speed adjustment and which has a wide range of infinite adjustment in speeds. The drive motor is generally run at a constant speed giving a constant horsepower output, and a variable speed belt drive is employed in place of the gear shifts.

Attempts to employ variable speed belt drives for lathes and other machines heretofore have always been with manual control setting and without the advantages of automatic selected settings.

According to the present invention the variable speed belt drive is provided with automatic speed settings for given cycles whereby, once the speeds have been selected, it is possible to automatically repeat the necessary speed shifting for successive operations of the drive. Manual speed selection may be employed at any time within the range of the automatic settings.

The drawings furnished herewith illustrate the best mode of carrying out the invention as presently contemplated and set forth hereinafter.

The lathe illustrated in the drawing and to which the invention has been applied is a turret lathe wherein it is desired to shift the spindle speed for different faces of the turret automatically as the turret is indexed.

Figure 1:
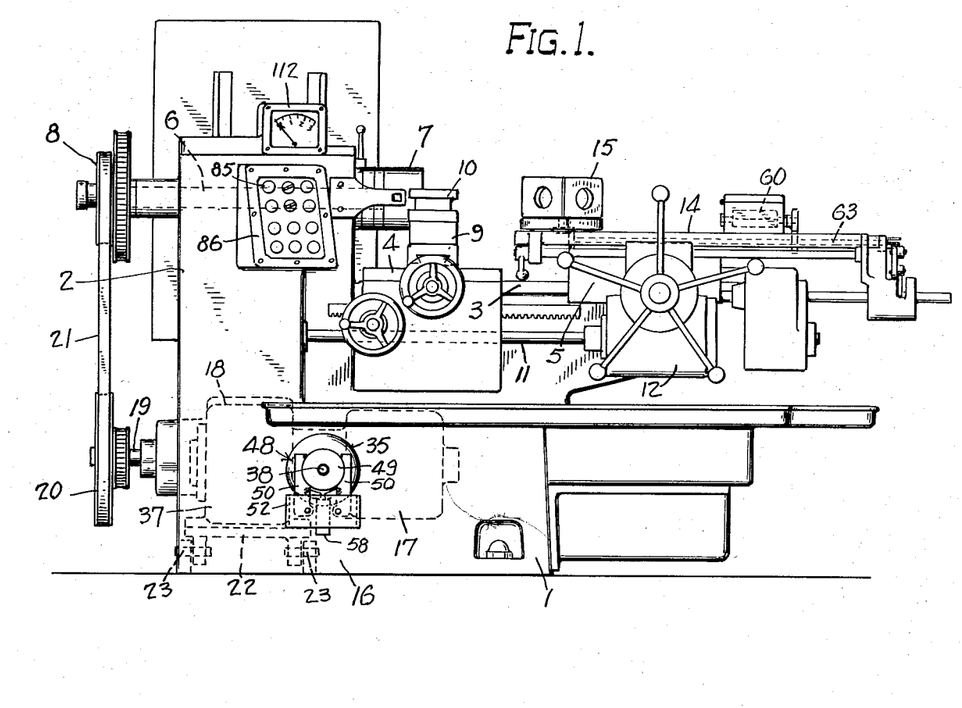
Figure 1 is a front elevation of a lathe to which the invention has been applied.

The lathe comprises, in general, a bed 1 having a headstock 2 at one end with longitudinal ways 3 extending horizontally therefrom, a tool carriage 4 on ways 3 and a turret carriage 5 also on the ways 3.

The headstock 2 carries the lathe spindle 6 which extends therethrough parallel to ways 3 and which is mounted for free rotation in suitable bearings. The end of spindle 6 protruding from headstock 2 toward carriages 4 and 5 carries a work holding chuck 7. The opposite end of the spindle 6 protrudes oppositely from headstock 2 and carries a suitable step drive pulley 8 secured thereto.

The tool carriage 4 carries a cross slide 9 upon which a square turret type tool post 10 is mounted for moving a cutting tool toward and away from the work held by chuck 7. A suitable feed rod 11 extends along the front of bed 1 from headstock 2 and passes through the front aprons of carriages 4 and 5 to drive the latter.

The turret carriage 5 has a front apron 12, and a saddle 13 carrying a ram 14 with a turret 15 mounted on the ram. The front apron 12 contains a transmission driven by feed rod 11 and which feeds the ram 14. Carriage and other ram movements may be either manual or automatic. Feed rod 11 is driven by suitable gearing from the spindle 6 in the headstock 2, whereby the ram 14 is fed in synchronism with the spindle speed.

Figure 5:
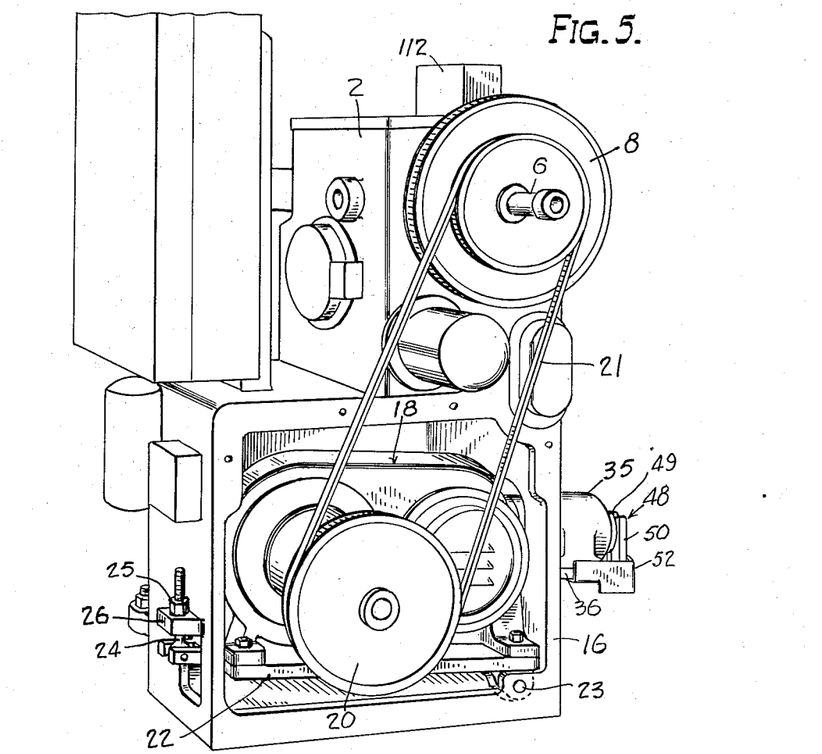
Fig. 5 is a perspective view showing principally the left end of the lathe with the belt guard and end plate removed to show the drive for the spindle.
Figure 6:
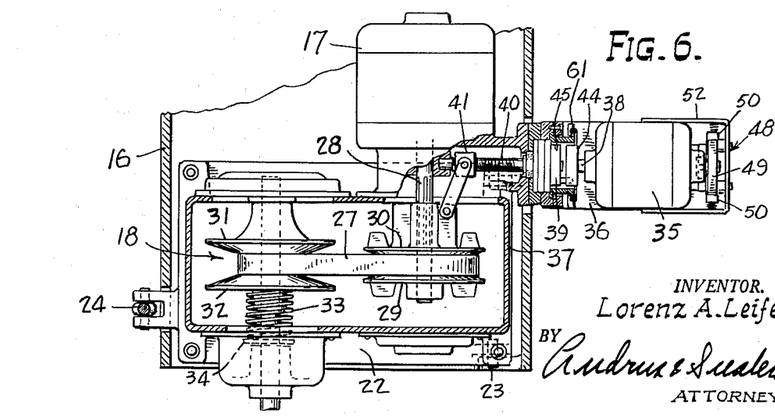
Fig. 6 is a substantially horizontal section taken axially of the drive shafts of the motors.

The present invention relates more specifically to the drive for spindle 6 and to the automatic control thereof by and in response to given index positions of the turret 15. For this purpose the base 16 of headstock 2 houses a drive unit comprising an electric drive motor 17 and a variable speed transmission 18 with an output shaft 19 carrying the step pulley 20 aligned with step pulley 8. Pulleys 8 and 20 are adapted to receive a belt 21 for driving pulley 8 and spindle 6 from pulley 20 and shaft 19.

The drive motor 17 and transmission 18 are carried by a floating base 22 horizontally pivoted to housing 16 by hinge 23 along the front side and suspended at the rear side by a link 24, the upper end of which has a nut 25 threaded thereon and resting on a bracket 26 on the rear side of the housing 16. Loosening of the nut 25 on link 24 drops the weight of the motor 17 and transmission 18 upon the belt 21 and tightens the latter.

The variable speed transmission 18 comprises a belt 27 disposed to drive output shaft 19 from the shaft 28 of motor 17 by means of adjustable cone pulleys upon the respective shafts.

The cone pulley on motor shaft 28 comprises a pair of frusto-conical discs 29 and 30 facing each other with disc 29 fixed both axially and rotationally to the shaft and disc 30 splined to the shaft for axial movement thereon toward and away from disc 29.

Similarly the cone pulley on output shaft 19 comprises a pair of frusto-conical discs 31 and 32 facing each other with disc 31 fixed both axially and rotationally to the shaft and disc 32 splined to the shaft for axial movement thereon toward and away from disc 31.

The belt 27 rides between the frusto-conical faces of each pair of discs, and is driven by discs 29 and 30 and in turn drives discs 31 and 32.

Separation or closing together of the discs 29 and 30 will determine the effective radius for belt 27 riding therebetween and the consequent peripheral or linear speed for the belt. With a constant speed motor 17 the variation in belt speed obtainable depends upon the pitch of the discs, the practical width of belt usable therewith, and the maximum and minimum diameters of the working area of the discs.

Disc 32 is constantly biased toward disc 31 by a coil spring 33 disposed around shaft 19 between the back side of disc 32 and a washer 34 pinned to the shaft. When discs 29 and 30 are separated letting belt 27 ride at the bottom of the V-groove therebetween and with a small effective drive radius and belt speed, the spring 33 forces disc 32 toward disc 31 until the belt 27 rides near the outer periphery of the latter thereby effecting a slow rotation for shaft 19. When disc 30 is forced toward disc 29 until belt 27 rides near the outer periphery of the latter, as shown, a maximum drive radius and belt speed will be attained, and the belt will force separation of disc 32 from disc 31 against spring 33 so that a small drive radius for the belt in the bottom of the groove between discs 31 and 32 will effect a high speed drive for shaft 19.

The belt 27 is maintained normal to shafts 19 and 28 by disposing fixed disc 29 of the drive pulley on one side of the belt and fixed disc 31 of the driven pulley on the opposite side of the belt so that as the belt rides up the cone of one disc it is riding down the cone of the other disc, and vice versa.

It has been found possible to obtain a range of speeds for shaft 19 wherein the maximum speed is as much as eight times the minimum speed, a range considerably greater than is practical with motor speed changing. An infinite adjustment of speed is obtainable within the range and during driving operations without necessitating declutching and loss of torque. The use of step pulleys 8 and 20 provides two sets of variable speed ranges for spindle 6.

Figure 7:
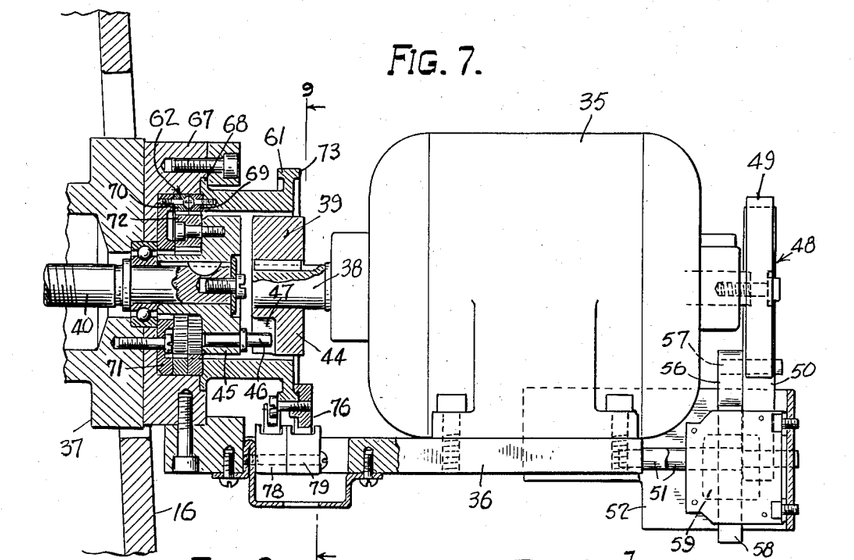
Fig. 7 is an enlarged axial section of the control motor taken on line 7—7 of Fig. 9.

The position of disc 30 is adjusted automatically by means of a reversible speed change motor 35 supported at the front of base 16 by a bracket 36 on the frame or housing 37 for the transmission 18 and extending through an opening in the front wall of the base. For convenience the motor 35 is shown as an electric motor, although hydraulic and air motors may be employed.

The shaft 38 for control motor 35 is connected by a coupling 39 to threaded shaft 40 carrying a nut 41. A link 42 connects nut 41 to a thrust member 43 at the back of disc 30 for moving the latter axially as nut 41 is threaded along shaft 40.

The coupling 39 comprises a driver member 44 keyed on the end of shaft 38 to rotate therewith, a driven member 45 secured on the end of threaded shaft 40 and facing member 44 with shafts 38 and 40 in substantial alignment, and a drive pin 46 secured in the face of driven member 45 and extending into a radial slot 47 in the face of driver member 44.

The range of movement of nut 41 to produce a full range of speed change for output shaft 19 is approximately the axial length of the usable threads on shaft 40, and the revolutions of shaft 40 corresponding to the number of usable threads will produce the entire range of speed change desired.

The position of nut 41 on threaded shaft 40 at any given time determines the position of disc 30 relative to disc 29 and the consequent speed ratio between motor shaft 28 and output shaft 19.

According to the invention control motor 35 is started and stopped automatically and accurately to provide predetermined speed ratios between drive motor 17 and output shaft 19 for the successive operations of the lathe during a work cycle.

Figure 8:
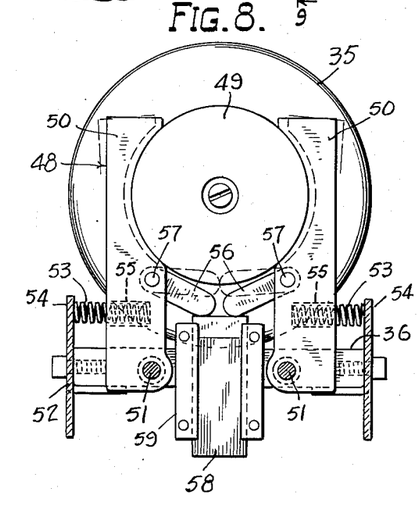
Fig. 8 is a right end elevation of Fig. 7 with parts broken away and sectioned to show the brake for the control motor.

For this purpose the motor 35 is provided with a solenoid brake 48 mounted at the end opposite driver 44.

The brake 48 comprises a disc 49 secured to the end of shaft 38 to rotate therewith, and a pair of upstanding brake shoes 50 pivotally supported by anchor pins 51 at the bottom of the frame 52. The disc 49 is disposed between concave brake faces of shoes 50.

The shoes 50 are biased at all times toward disc 49 by separate compression coil springs 53, each being confined between the corresponding brake shoe 50 and an upstanding side member 54 of frame 52. The inner end of each spring 53 extends into a bore 55 on the back of the corresponding brake shoe 50 to hold the spring in place.

The brake is released by means of a pair of toggle links 56 each having one end pivoted by a pin 57 to a corresponding brake shoe 50 and having its free end facing the free end of the opposite link and freely supported on the upper end of a solenoid plunger 58.

Raising of plunger 58, as shown in Fig. 8 in dotted lines, by energization of the solenoid coil 59 pushes the links 56 upwardly effecting a toggle action by engagement of the free ends of the links and which forces the brake shoes 50 apart against their corresponding springs 53. With the brake shoes 50 separated as described, disc 49 is free to rotate in either direction.

The solenoid coil 59 is carried by frame 52 and is always energized simultaneously with the energization of control motor 35, and de-energized simultaneously with the de-energization of motor 35. When coil 59 is de-energized the toggle links 56 drop and brake shoes 50 are instantly forced into braking engagement with disc 49 by springs 53.

Figure 3:
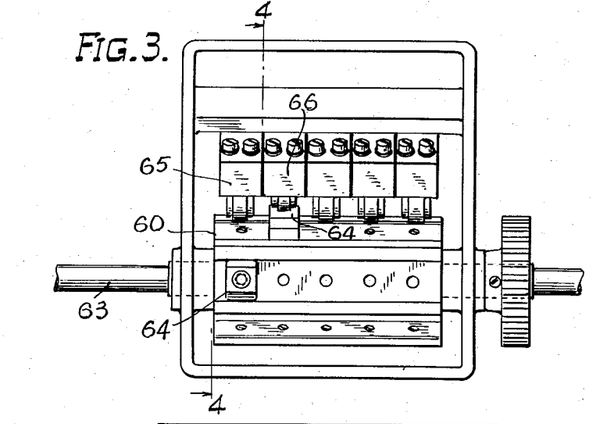
Fig. 3 is an enlarged top plan view of the control drum.
Figure 4:
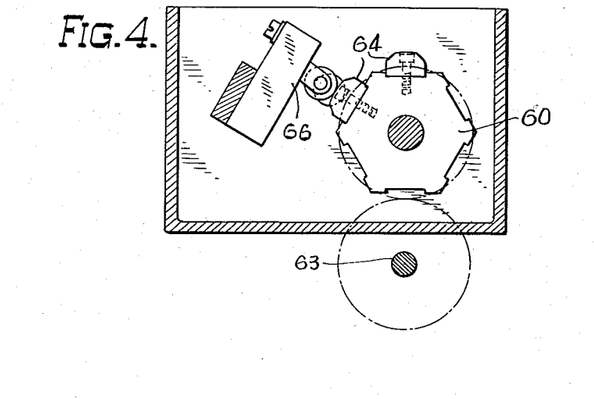
Fig. 4 is a transverse vertical section taken on line 4—4 of Fig. 3.

Automatic actuation of control motor 35 is accomplished by means of two sets of limit switches, one on control drum 60, the shaft of which is geared to operate in direct accord with the rotational indexing of turret 15, and the other on a control dial 61 mounted by means of a gear reduction unit 62 on the threaded shaft 40.

The drum 60 is mounted on the rear end of the ram 14 and for convenience is geared to the turret stop roll 63 which is turned simultaneously with the turret 15 during indexing of the latter. The drum 60 has six sides, corresponding to the six sides of turret 15, and which are adapted to have secured thereto at selected positions therealong a plurality of control buttons 64.

On the drum 60 shown there are five spaces for buttons 64 to be placed on each drum face. Only the first two spaces are utilized for the present invention, the other spaces being employed to provide double or skip index of the turret, to provide for reversing the spindle, and for automatic spindle stop and chuck actuation.

When a button 64 is placed in the first space (at the left end of the drum as shown in Fig. 3) it is disposed to actuate a limit switch 65 as the drum stops with the button pressing the actuating lever of the switch. A button 64 in the second space on the drum 60 will actuate a limit switch 66 as the drum stops with the button pressing the actuating lever of the switch.

When no button is placed in either the first or second space of the drum for a given face of the drum, neither limit switch 65 or 66 will be actuated as that face becomes indexed.

The control dial 61 comprises a cylindrical member having its inner end mounted for rotation in an adapter 67 secured to the frame 37. The inner end of the cylindrical dial member 61 is flanged at 68 and carries a ring gear 69 facing radially inward.

The adapter 67 carries a ring gear 70 similar to ring gear 69 and disposed adjacent the same. Gear 70 is secured to the stationary adapter 67 by a gear retainer 71 and suitable screws.

The driven member 45 on the threaded shaft 40 rotates concentrically within dial member 61 and carries on its face a pinion gear 72 which meshes with both ring gears 69 and 70.

By constructing ring gears 69 and 70 with different numbers of gear teeth, as for instance where the gear 69 has one less tooth than gear 70, a slow rotation is provided for ring gear 69 as pinion 72 moves around the inner circumferences of the ring gears as when shaft 40 is rotated. In the construction illustrated the twenty-six revolutions of shaft 40 to cover the entire range of speed change is made effective by the reduction gearing to turn dial member 61 approximately two-thirds of a revolution.

Figure 9:
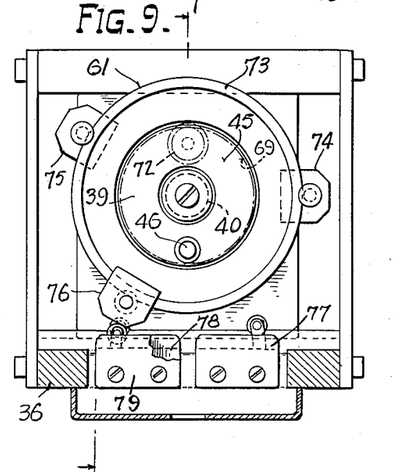
Fig. 9 is a vertical section taken on line 9—9 of Fig. 7 and showing the limit switch actuating means in elevation with the drive motor removed.
Figure 10:
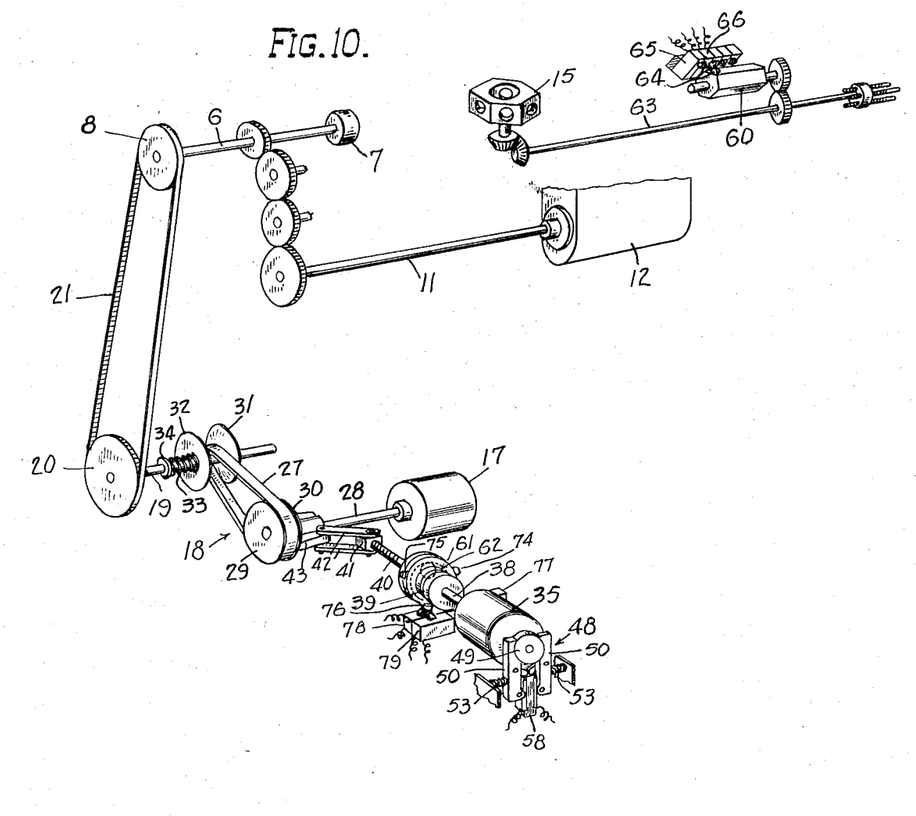
Fig. 10 is a schematic diagram of the mechanical features.

The outer end of dial member 61 has a flange 73 thereon which carries adjustably placed trip cams 74, 75 and 76 clamped on its circumference. Cams 74 and 75 are on the rear side of flange 73 and represent respectively the selected fastest speed position and the slowest speed position for the spindle. Cam 76 is on the front side of flange 73 and represents a selected intermediate speed for the spindle.

Cams 74, 75 and 76 are offset axially of flange 73 so that each is aligned to engage and trip a separate limit switch 77, 78 and 79, respectively secured to the bracket 36 which supports motor 35 and frame 52.

Figure 11:
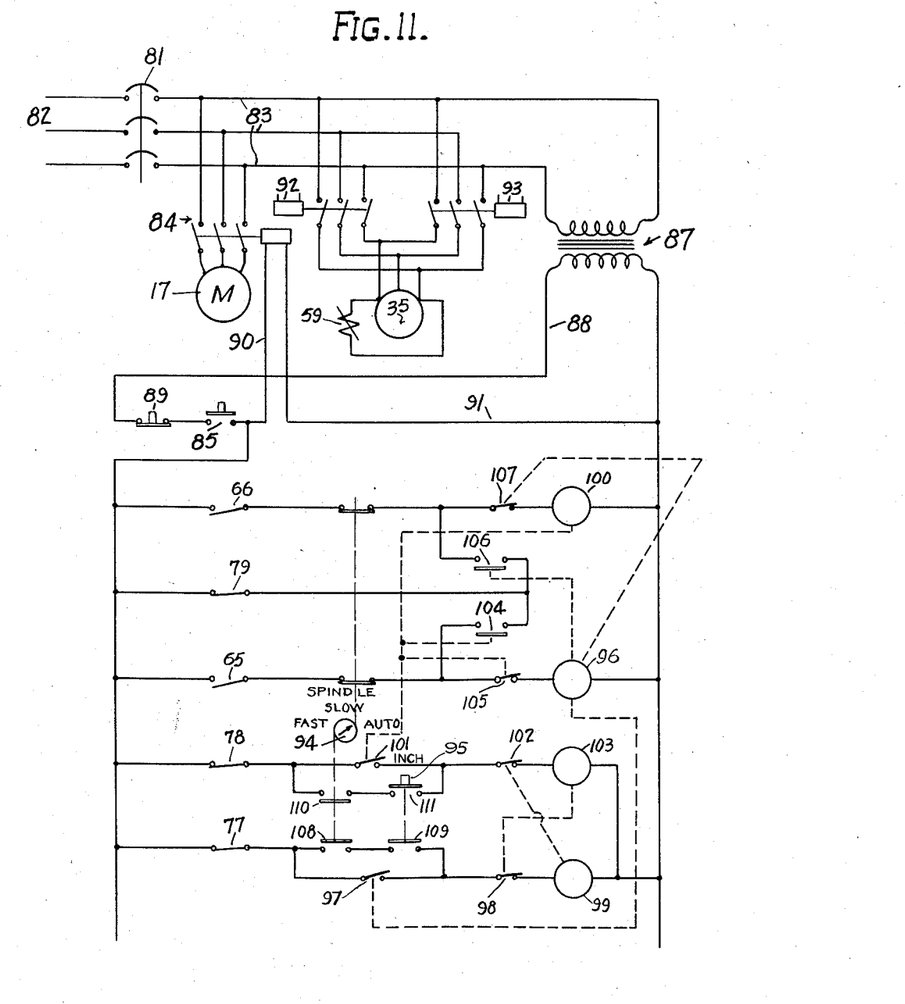
Fig. 11 is a wiring diagram showing the control circuits having to to do with spindle speed control.

Referring to the wiring diagram in Fig. 11, only so much of the wiring is shown as will be necessary to an explanation of the present invention; the other parts of the diagram being related to clutch and chuck operation and to turret and tool feed and indexing.

The machine is connected by suitable protective circuit breaker 81 and the three-wire supply line 82 to a source of suitable three-phase current.

The main drive motor 17 is placed in circuit across main lines 83 leading from circuit breaker 81 by a three-pole relay 84, the solenoid of which is energized by a control circuit closed by the "machine start" push button or switch 85 on the front control panel 86 on headstock 2. The control circuit comprises the secondary of a transformer 87, the primary of which is connected across the lines 83, lead line 88, normally closed stop button switch 89, start switch 85, lead 90 to the solenoid of relay 84, and lead 91 back to the secondary of transformer 87.

The speed change control motor 35 is placed in circuit across the main lines 83 by two alternative solenoid operated relays, relay 92 serving to connect the motor for forward actuation, and relay 93 serving to connect the motor for reverse actuation.

Figure 2:
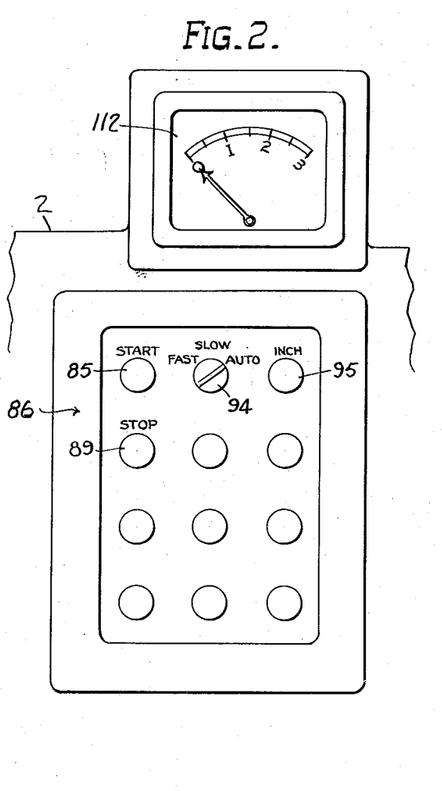
Fig. 2 is an enlarged elevation of the control panel and meter.

The panel 86 on the front of the headstock contains the several control buttons for the operations as shown in the enlarged elevation of the panel in Fig. 2. Only those control buttons that are important with respect to the present invention will be described here.

Referring to Fig. 2 it will be noted that start button switch 85 and stop button switch 89 are disposed at the left hand side of the panel near the top. The other two top buttons are also important to the invention.

The central top button is a turn knob 94 which has three positions: "Fast—Slow—Auto," the latter one meaning automatic; and the other two being used for manual operation principally in setting cam positions.

The right hand top button 95 is a manual inch switch used for manual speed change as when setting cam positions and adjusting the machine.

Referring again to the wiring diagram and assuming that nut 41 is at the slowest setting for the speed control belt 27 with the knob 94 turned to "automatic" and button 64 in the second space on drum 60 holding limit switch 66 closed, and with dial 61 in its farthest counter-clockwise position with cam 75 holding limit switch 78 open. The control motor 35 will be disconnected and its rotor will be held against rotation by means of brake shoes 50.

With the lathe running under the above conditions the spindle will be running slow. Now assume further that the turret 15 is indexed to the next operative face and that drum 60 has a button 64 secured in the first space for that face.

During the indexing of the turret 15 and drum 60 the button 64 in the second space on the drum will leave limit switch 66 and the switch will open. Immediately thereafter the button 64 in the first space on the drum will engage limit switch 65 and close the same.

Closing of limit switch 65 closes a circuit from the secondary of transformer 87 through the coil of a time delay relay 96 which then closes normally open contacts 97 completing a control circuit from the secondary of transformer 87 through normally closed limit switch 77, normally closed contacts 98 of the reverse motor control relay 93 to be described hereinafter, and the coil 99 of the forward motor control relay 92 which latter closes the forward drive circuit for control motor 35.

Motor 35 will rotate forwardly driving threaded shaft 40 to shift nut 41 toward the speed change control mechanism thereby pushing the disc 30 towards axially fixed disc 29 to reduce the space between the two discs and increase the speed of belt 27 and of output shaft 19 and spindle 6.

Rotation of motor 35 will continue and dial 61 will rotate clockwise until cam 74 engages the actuating lever of limit switch 77 and opens the latter, whereupon the above described control circuit will be opened and motor 35 will stop, brake shoes 50 being immediately applied to disc 49.

In this position the spindle is at the fast speed setting with button 64 on the first space of drum 60 holding normally open limit switch 65 closed, with time delay relay coil 96 energized, cam 74 holding limit switch 77 open and the brake applied to prevent further change of speed.

Upon the next indexing of turret 15 assume that drum 60 has a button on the second space and none on the first. Under these conditions as switch 65 is released during initial indexing rotation of the drum the coil of time delay relay 96 will become de-energized, thereby opening contacts 97.

Completion of the indexing of turret 15 and drum 60 causes button 64 in the second space to close limit switch 66 thereby closing a circuit from the secondary of transformer 87 through a time delay relay 100 which then closes the normally open contacts 101 completing a control circuit from the secondary of transformer 87 through normally closed limit switch 78, the normally closed interlock contacts 102 of relay coil 99, and the relay coil 103 of relay 93 which latter closes the reverse drive circuit for control motor 35.

Following the indexing just described motor 35 will rotate in a reverse direction threading nut 41 on shaft 40 outwardly to separate discs 29 and 30 and reduce the speed of spindle 6 until cam 75 engages and opens limit switch 78 at which time the motor 35 stops and the brake shoes 50 are applied to disc 49.

Where the face of drum 60 fails to have any button 64 at either the first or second spacing thereon the motor 35 will operate to change the spindle speed to an intermediate speed setting determined by the engagement of limit switch 79 by cam 76 on dial 61. This is so quite regardless of whether the previous spindle speed setting was high or low.

Assuming that the spindle speed for the previous index was low and limit switch 66 was held closed by a button 64 on drum 60. As the drum is indexed to a "no button" face, limit switch 66 is released and opens, thereby de-energizing time delay relay 100. The time lag after de-energizing relay 100 is adjusted to be sufficient to maintain contacts 104 closed in a circuit containing normally closed limit switch 79, normally closed interlock contacts 105 of relay coil 100 and the coil of time delay relay 96. The interlock contacts 105 close immediately upon deenergization of coil 100, and there is a delay of several seconds before the opening of contacts 104, during which time relay coil 96 is energized to close normally open contacts 97 completing the circuit through normally closed limit switch 77, the normally closed interlock 98 and the coil 99 of relay 92, thereby actuating motor 35 to increase the spindle speed until cam 76 engages limit switch 79 and positively breaks all energization for both relay coils 96 and 99.

Where the desired direction for motor 35 is opposite to that just described the relays 96 and 100 will be reversed in the description and contacts 106 will be substituted for contacts 104 and interlock 107 substituted for interlock 105 in the description.

The time delay between the respective closing of either contacts 105 or 107 and the opening of the corresponding contacts 104 and 106, respectively, is important to enable the motor 35 to reach the intermediate speed setting determined by the position of cam 76 on dial 61.

When it is desired to manually control the operation of motor 35, as when setting cams 74, 75 and 76, the knob 94 is turned to either the "fast" or the "slow" position in which case contacts 112 and 113 in series with limit switches 65 and 66, respectively, are opened.

With knob 94 in the "fast" position the normally open contacts 97 of relay 96 may be bypassed through contacts 108 which are closed by knob 94 and through the contacts 109 which are closed manually by the speed inch button 95, thereby completing a circuit for relay coil 99 through normally closed limit switch 77, normally closed contacts 98, and coil 99.

With knob 94 in the "slow" position the normally open contacts 101 of relay coil 100 may be bypassed through contacts 110 which are closed by knob 94 and through the contacts 111 which are closed manually by the speed inch button 95, thereby completing a circuit for reverse relay coil 103 through normally closed limit switch 78, normally closed contacts 102, and coil 103.

During manual inching of motor 35 as just described, the energization of either interlock relay coils 99 and 103 opens the corresponding interlocking contacts 102 and 98 respectively.

In setting cams 74, 75 and 76 the spindle speed meter 112 is provided above the panel 86 for the convenience of the operator. Accurate stopping of speed change motor 35 when any given speed for spindle 6 is reached, is obtained merely by releasing the manual speed inch button 95, thereby opening the circuit of motor 35 and solenoid coil 59 and instantly applying brake shoes 50 to brake disc 49.

The intermediate speed setting can be obtained either from the low or the high speed position. By using a long cam 76 on the dial 61 for obtaining the intermediate speed, it is possible to obtain two intermediate speeds: a low intermediate speed obtained by reaching the intermediate speed from the "low" speed position, and a high intermediate speed obtained by reaching the intermediate speed from the "high" speed position.

The invention provides an automatic speed shift to any pre-selected speed for the spindle without loss of torque as in the mechanical clutch drives heretofore employed, and with much simpler construction and wider ranges of adjustment than possible with former drive motor speed controls. The horsepower effective for spindle drive remains substantially constant throughout the range of speed change. The shift can be made responsive to any cyclic control as is present with turret indexing in machine tools and the like.

Various modes of carrying out the invention are contemplated as within the scope of the following claims particularly pointing out and distinctly claiming the subject matter which is regarded as the invention.

I claim:

1. An automatic drive speed control for use in driving cyclically operating machines and the like where shifting of speeds is desired without interruptions of drive torque and where a wide range of infinite pre-selected adjustment in speed is desired, comprising a variable speed belt drive, and means providing a pre-selected automatic shifting of speed control of said belt drive for repeat cycle operation, said last named means comprising a reversible electric control motor, power circuit means to selectively drive said motor in either forward or reverse direction and adapted to be actuated under the automatic control of the cyclic operation of the machine being driven, speed reduction means connected to said control motor by a universal coupling and to a shift member of said variable speed belt drive by a threaded output nut drive to increase or decrease the speed output of the belt drive depending upon the direction of operation of said control motor, a cam control means driven by said speed reduction means and having a rotatable disc upon which a pair of stops are adjustably mounted at positions for determining the fast and slow speed settings for said variable speed belt drive, a pair of limit switches disposed for actuation by corresponding stops on said disc and connected in the power circuit of said control motor to open the same when actuated by a stop, brake means automatically applicable to stop said motor upon opening of said motor circuit, and means adapted to be responsive to the cycling of the machine being driven and by-passing said limit switch to close said motor circuit and release said brake to effect shifting of said belt drive to the opposite pre-selected stop position.

2. An automatic drive speed control for use in driving cyclically operated machines and the like where shifting of speeds is desired without interruption of drive torque and where a wide range of infinite pre-selected adjustment in speeds is desired, comprising a variable speed belt drive having selectable output speeds determined by infinite adjustment of the drive within its capacity range, and means providing a pre-selected automatic shifting of speed control of said belt drive for repeat cycle operation, said last named means comprising a reversible electric control motor, power circuit means to selectively drive said control motor in either forward or reverse direction and adapted to be actuated under the automatic control of the cyclic operation of the machine being driven, speed reduction means connected to said control motor by a universal coupling and to a shift member of said variable speed belt drive by a threaded output nut drive to increase or decrease the speed output of the belt drive depending upon the direction of operation of said control motor, a cam control means driven by said speed reduction means and having a rotatable disc upon which a pair of stops are adjustably mounted at positions for determining the fast and slow speed settings for said variable speed belt drive, a pair of limit switches disposed for actuation by corresponding stops on said disc and connected in the power circuit of said control motor to open the same when actuated by a stop, brake means automatically applicable to stop said motor upon opening of said motor circuit, an intermediate stop adjustably located on said disc for determining a pre-selected intermediate speed for said belt drive, a limit switch actuated by said intermediate stop and connected in the power circuit for said motor to open the same when the switch is actuated, and circuit means associated with said power circuit and adapted to be actuated by the cycling of the machine being driven to selectively by-pass said intermediate limit switch when the cycle calls for a shift of speed beyond said intermediate speed.

3. An automatic drive speed control for use in combination with a cycling control drum adapted to effect successive cyclic operations of the drive requiring shifting of speeds between a plurality of speeds pre-selected by adjustment infinitely variable within the range of speed adjustment for the drive, comprising a constant speed drive motor, a variable speed belt drive driven by said motor and having a plurality of infinitely variable selectable output speeds within its capacity range, and means providing a pre-selected automatic shifting of speed control of said belt drive between said output speed under the control of the cycling drum for repeat cycles of operation, said last named means comprising a reversible electric control motor, power circuit means to selectively drive said control motor in either forward or reverse direction under the automatic control of the cycling drum, speed reduction means, means universally coupling said control motor to said speed reduction means to drive the latter, a threaded member driven by said reduction means, a nut on said threaded member to be moved thereby, link means connecting said nut to a shift member of said variable speed belt drive whereby the speed output of said drive is increased or decreased depending upon the direction of operation of said control motor, a cam control means driven by said speed reduction means and having a rotatable disc upon which a plurality of stops are adjustably mounted in predetermined circumferentially spaced relation for determining corresponding speed settings for said belt drive, a limit switch for each said stop and adapted to be actuated thereby upon rotation of said disc to a position where said stop engages the corresponding switch, means actuated by the control drum for connecting the corresponding limit switch in the power circuit of the control motor whereby actuation of the switch by the corresponding stop opens said power circuit to de-energize the control motor, brake means automatically actuated upon opening of the power circuit for said control motor to stop the motor and hold the same at the stopped position, and means responsive to said control drum to again close said motor circuit and release said brake to effect shifting of said belt drive to another pre-selected speed setting.

4. In a spindle speed control for a machine tool having a constant speed main drive motor, a variable speed transmission driven by said motor, a work spindle connected to be driven from said variable speed transmission, and means for adjusting said variable speed transmission comprising a reversible electric control motor, power circuit means to selectively drive said control motor in either forward or reverse direction, speed reduction means connecting said control motor to said variable speed transmission to effect an increase in the speed output of said transmission when said control motor is operated in one direction and to effect a decrease in the speed output of said transmisison when said control motor is operated in the opposite direction, said power circuit means for said control motor including alternate forward and reverse drive connections with stop means in each for de-energizing and braking said motor, means driven by said speed reduction means to actuate said stop means in said power circuit, said last named means being adjustable to pre-select any one of a plurality of predetermined speeds for the output of said variable speed transmission by stopping said control motor when said transmission has been adjusted to the given speed, and means to actuate said power circuit means to effect cyclic speed control of the operation of said spindle.

References Cited in the file of this patent

UNITED STATES PATENTS

| | | |
|---|---|---|
| 2,036,260 | Curtis | Apr. 7, 1936 |
| 2,489,725 | Rutemiller | Nov. 29, 1949 |
| 2,506,028 | Letourneau | May 2, 1950 |